United States Patent
Russell

(10) Patent No.: US 9,846,795 B2
(45) Date of Patent: Dec. 19, 2017

(54) RFID READER INTEGRATION WITH A LIGHT SOURCE

(71) Applicant: Amazon Technologies, Inc., Seattle, WA (US)

(72) Inventor: Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 14/497,961

(22) Filed: Sep. 26, 2014

(65) Prior Publication Data

US 2016/0092704 A1   Mar. 31, 2016

(51) Int. Cl.
| | |
|---|---|
| G06K 7/10 | (2006.01) |
| F21K 99/00 | (2016.01) |
| F21V 23/04 | (2006.01) |
| G01P 13/00 | (2006.01) |
| G06Q 90/00 | (2006.01) |
| F21K 9/232 | (2016.01) |

(52) U.S. Cl.
CPC ...... *G06K 7/10118* (2013.01); *F21V 23/0471* (2013.01); *G01P 13/00* (2013.01); *G06K 7/10009* (2013.01); *G06K 7/10336* (2013.01); *G06K 7/10425* (2013.01); *G06Q 90/00* (2013.01); *F21K 9/232* (2016.08)

(58) Field of Classification Search
CPC . F21V 23/0471; G01P 13/00; G06K 7/10118; G06K 7/10009; G06K 7/10425; G06K 7/10336; G06Q 90/00; F21K 9/00; F21K 9/232

USPC ........................................................ 340/10.3
See application file for complete search history.

(56) References Cited

U.S. PATENT DOCUMENTS

| | | | | |
|---|---|---|---|---|
| 6,677,852 | B1* | 1/2004 | Landt ................... | G06K 7/0008 235/375 |
| 2009/0196016 | A1 | 8/2009 | Massara et al. | |
| 2009/0289793 | A1* | 11/2009 | Morin .................. | G06K 7/0008 340/572.1 |
| 2009/0309704 | A1* | 12/2009 | Chang ...................... | H04Q 9/00 340/10.1 |
| 2010/0007464 | A1* | 1/2010 | McTigue ............. | G06Q 10/087 340/10.1 |
| 2011/0001436 | A1* | 1/2011 | Chemel ................ | H05B 37/029 315/291 |

(Continued)

OTHER PUBLICATIONS

International Search Report for PCT/US2015/050693 dated Nov. 25, 2015.

*Primary Examiner* — Edwin Holloway, III
(74) *Attorney, Agent, or Firm* — Thomas | Horstemeyer, LLP

(57) ABSTRACT

Disclosed are various embodiments for a light bulb or other type of lighting fixture that integrates a light source and a radio frequency identification (RFID) reader. Embodiments of the disclosure can also forward identifiers corresponding to RFID tags detected by the RFID reader to another computing device that can facilitate identification of products or items associated with the RFID tags. RFID tags are energized with interrogator signals and/or an electromagnetic field emitted from the RFID reader and submit a response, which can be forwarded, or data extracted and transmitted, to another computing device.

20 Claims, 13 Drawing Sheets

(56) References Cited

U.S. PATENT DOCUMENTS

| | | | |
|---|---|---|---|
| 2012/0026726 A1* | 2/2012 | Recker | F21K 9/13 362/157 |
| 2012/0056720 A1* | 3/2012 | Barvick | G06K 7/10009 340/10.1 |
| 2012/0075101 A1* | 3/2012 | Austin | G01P 13/00 340/572.1 |
| 2012/0200389 A1* | 8/2012 | Solomon | G06Q 10/087 340/5.52 |
| 2013/0063317 A1* | 3/2013 | Jonsson | H01Q 1/44 343/721 |
| 2015/0371771 A1* | 12/2015 | Abu Qahouq | H04B 5/0087 307/104 |

* cited by examiner

RFID READER INTEGRATION WITH A LIGHT SOURCE

BACKGROUND

Products purchased by consumers are increasingly being accompanied by radio frequency identification (RFID) tags that are integrated within the product's packaging or within the product itself. Such an RFID tag can be associated with an identifier that facilitates identification of the product. For example, an article of clothing may be tagged with a passive RFID tag, which is a relatively inexpensive RFID tag that does not require an internal power source. An RFID reader can read data stored on such a tag, such as an identifier that identifies product information, such as a universal product code (UPC) or any other type of identifier from which a product can be identified.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed to various embodiments for integrating an RFID reader in a residential environment to facilitate identification of RFID tags that may be present in such an environment. The present disclosure may also be applicable to integration of an RFID reader in an office, commercial or industrial environment for the same purpose. In one embodiment, an RFID reader can be integrated with a light bulb that may be installed by a user in a light bulb socket. Light bulbs are often configured with a threaded metal or otherwise conductive base that may also be known as an Edison screw, which can be installed into a light bulb socket to provide an electrical connection between a light fixture providing an electricity source and the light bulb. Accordingly, embodiments of the disclosure are directed to integrating an RFID reader with a light bulb so that a light source and the RFID reader are in a common housing that can be installed into a light bulb socket.

In this way, a user may be able to install an RFID reader in various locations in a residential or other type of environment without having to occupy an electrical wall socket or perform an installation of a separate RFID reader. Embodiments of the disclosure can scan an area in which a light bulb as described herein is installed in order to obtain data stored on RFID tags that may be within the area. For example, products can be tagged with RFID tags, whether passive, semi-passive or active tags. The RFID tags can store an identifier that facilitates identification of the product, such as a UPC, stock keeping unit (SKU) or any other identifier that can facilitate identification of a product or its properties in a product catalog. A light bulb or other device as described herein can be configured to transmit RFID interrogator signals, or generate an electromagnetic field that inducts current in one or more RFID tags that are within range of the device.

In response to current being inducted within the RFID tag, the RFID tag can issue a response that includes data that is stored within the RFID tag, such as a product identifier. With such a product identifier, the light bulb can facilitate identification of the product as well as various other products within range of the light bulb that may also issue such a response to the RFID reader.

Figure 1:
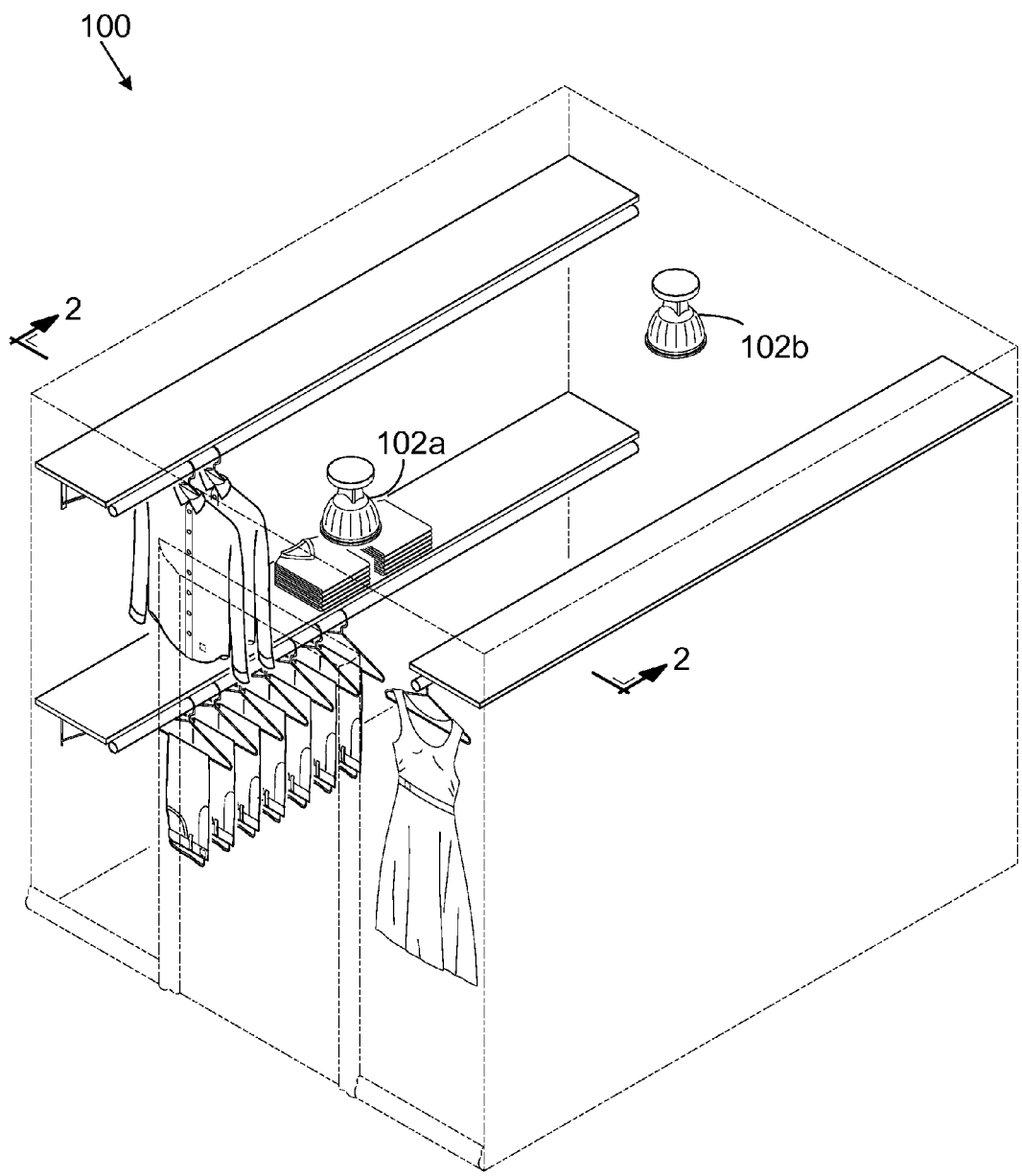
FIGS. 1-2 are drawings of an example scenario in accordance with various embodiments of the disclosure.

Accordingly, reference is now made to FIG. 1, which depicts one example scenario 100 in accordance with various embodiments of the disclosure. In the scenario 100 shown in FIG. 1, light bulbs 102a and 102b are shown installed within a room in a residential environment. In the depicted example, the light bulbs 102a and 102b can be equipped with a light source as well as an RFID reader according to embodiments of the present disclosure. The light bulbs 102a, 102b are configured to be coupled to an electricity source that powers the light source to emit light into the room as well as power the RFID reader that is integrated within the housing of the light bulb 102a, 102b. Multiple light bulbs 102a, 102b can be positioned in various rooms within a single home, building or other type of environment to facilitate identification or tracking of various items or products in a particular environment.

Figure 2:
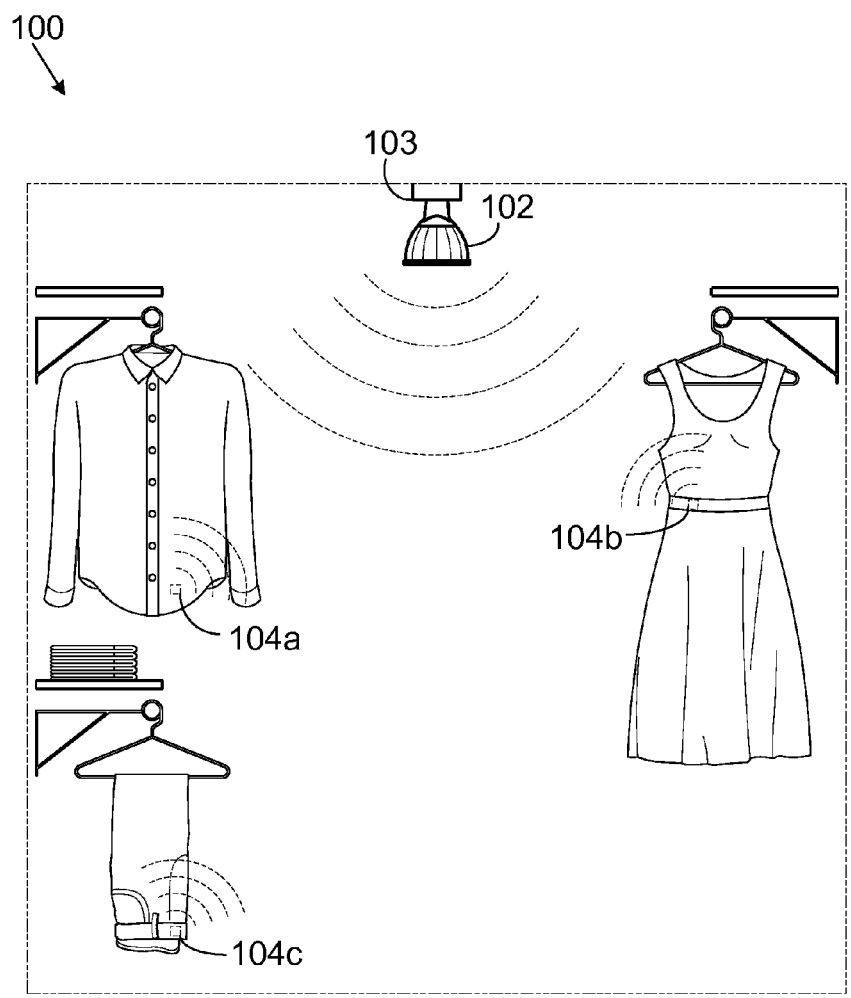

Continuing the example of FIG. 1, reference is now made to FIG. 2, which illustrates an alternative view of the scenario 100 shown in FIG. 1. As shown in FIG. 2, the light bulb 102 is installed in a light fixture 103 that provides an electricity source. The light fixture 103 can also be coupled to a switch that can activate and/or deactivate an electricity source provided to the light bulb 102. In some examples, the light fixture 103 can provide more than one electricity source to the light bulb 102. A first electricity source can be coupled to a switch that toggles the light source of the light bulb 102 and a second electricity source can be separate from the switch such that it remains active to facilitate transmission of RFID interrogator signals. The light bulb 102 can initiate transmission of RFID interrogator signals in an area in which the light bulb 102 is installed. In some embodiments, the light bulb 102 and/or an antenna system associated with an RFID reader integrated within a housing of the light bulb 102 can be configured to direct interrogator signals directionally towards an area at which the light bulb 102 is aimed.

RFID tags 104a, 104b and 104c can be integrated within products, such as articles of clothing, by a product manufacturer. These RFID tags 104 can issue a response to the interrogator signals transmitted by the light bulb 102. The response can include data stored on the RFID tags 104, such as a product identifier. In one embodiment, the light bulb 102 can be equipped with a network interface, such as a Wi-Fi interface, a power-line communication interface, a ZigBee interface, a Z-Wave interface, or any other local or wide area networking communication interface. Accordingly, the light bulb 102 can communicate an identifier received from the RFID tags 104 via the network interface or network capability to another computing device, such as a server computing device that is accessible via the Internet or a local area network within the residential environment. The other computing device can facilitate identification of the product associated with a respective RFID tag and facilitate additional functionality, such as the creation of product recommendations as well as taking inventory or locating items or products within the residential environment.

In the following discussion, a general description of the system and its components is provided, followed by a discussion of the operation of the same. Although the description herein refers to various example embodiments, any example embodiments detailed herein are illustrative in nature.

Figure 3:
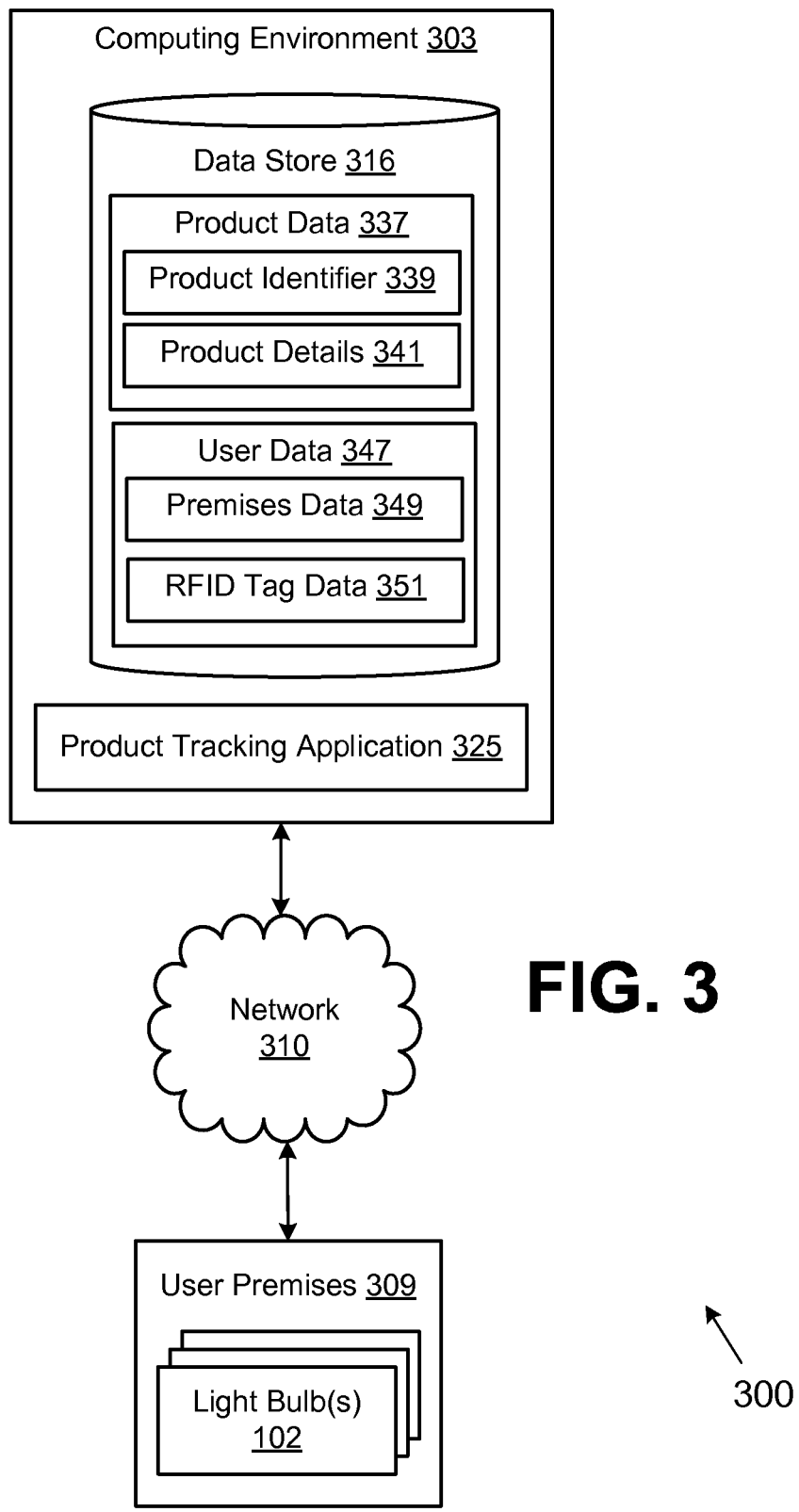
FIG. 3 is a drawing of a networked environment according to various embodiments of the present disclosure.

With reference to FIG. 3, shown is a networked environment 300 according to various embodiments. The networked environment 300 includes a computing environment 303 and a user premises 309, which are in data communication with each other via a network 310. The network 310 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, personal area networks, such as BLUETOOTH networks, ZigBee networks, or other home automation or appliance networks, and other types of networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 316 that is accessible to the computing environment 303. The data store 316 may be representative of a plurality of data stores 316 as can be appreciated. The data stored in the data store 316 for example, is associated with the operation of the various applications and/or functional entities described below.

The user premises 309 can represent one or more buildings, homes or other type of environment in which a light bulb 102 according to various embodiments of the disclosure may be installed within a light fixture, lamp or other type of device or installation that provides an electricity source to the light bulbs 102.

The components executed on the computing environment 303, for example, include a product tracking application 325, and other applications, services, systems, processes, engines, or functionality not discussed in detail herein. The product tracking application 325 is executed to facilitate identification of products or other items that correspond to identifiers associated with RFID tags 104 in a user premises 309. The product tracking application 325 can receive, via the network 310, identifiers that are associated with RFID tags 104 detected by one or more light bulbs 102 associated with a particular user premises 309. The product tracking application 325 can also facilitate generating product recommendations based upon the RFID tags 104 as well as facilitate taking inventory or tracking products and other items within a user premises 309. The RFID tags 104 may be associated with products or other types of items or materials located within or near the user premises 309.

The data stored in the data store 316 includes, for example, product data 337, user data 347, and potentially other data. The product data 337 can correspond to a product catalog that includes a listing of various products that may be available for browsing and/or purchasing via an electronic commerce system. In some embodiments, the product data 337 may also include information about products that may not be available via an electronic commerce system where the product catalog houses such information for informational purposes. The products in such a product catalog can also be associated with the one or more product identifier 339. A product identifier 339 can relate an identifier associated with an RFID tag 104 installed within or on a product to a product identifier 339 in the data store, which can include a unique identifier, UPC, SKU, model number, serial number, or other form of identifier from which a particular product or other type of item may be identified.

Product data 337 can also include additional product details 341, which can include product attributes, product descriptions, as well as other products or items with which the product is associated or related, which can facilitate the generating of product recommendations that are related for a particular product. For example, a particular article of clothing may be identified as related to another article of clothing by a style consultant so that, if the particular article of clothing is detected based upon an identifier associated with an RFID tag 104 by a light bulb 102 within a user premises 309, a product recommendation can be generated that recommends the related or complementary product to a user associated with the user premises 309.

The data store 316 can also include user data 347 associated with users of various user premises 309. For example, a particular user may acquire one or more light bulbs 102 and install the light bulbs 102 within the user's home. Accordingly, identifiers associated with RFID tags 104 within the user premises 309 that are detected by the light bulbs 102 can be reported to the product tracking application 325 and associated with a particular user. Accordingly, user data 347 can include a user profile that can contain data about the user such as demographic information, a location of the user, payment information of a user, a purchase history with respect to products available via an electronic commerce system, user interests and preferences, contact information, or other user profile data.

User data 347 can also include premises data 349, which stores information about one or more user premises 309 associated with a particular user. Premises data 349 associates a particular user premises 309 with a particular user account or user profile and also includes a respective identifier for the various light bulbs 102 that are associated with the user account. In one embodiment, a user may enroll, register or otherwise associate a light bulb 102 with the product tracking application 325 upon purchase and/or installation of the light bulb 102 within a light socket in the user premises 309 so that subsequent data received from RFID tags 104 that are obtained by the light bulb 102 and transmitted to the product tracking application 325 are associated with the correct user profile.

RFID tag data 351 includes information about RFID tags 104 that are identified within or near a user premises 309 associated with a particular user by a light bulb 102 installed within the user premises 309. RFID tag data 351 can include data corresponding to identifiers stored by an RFID tag 104 that are detected by light bulbs 102 installed within the user premises 309 and transmitted via the network 310 to the product tracking application 325. The product tracking application 325 can identify a product in a product catalog based upon such an identifier. In some embodiments, identifiers associated with RFID tags 104 in a user premises 309 can also correspond to items that are not products available via an electronic commerce system. For example, building materials such a lumber, siding, flooring, etc., that are installed within or near a user premises 309 may be tagged with RFID tags 104, which can be identified by a light bulb 102 and associated with a user account. Accordingly, for example, should a subsequent recall with respect to the building materials occur, the user can be notified by the product tracking application 325. Additionally, the product tracking application 325 may also generate product recommendations based upon this data.

Next, a general description of the operation of the various components of the networked environment 300 is provided. To begin, a user may install light bulbs 102 according to embodiments of the instant disclosure within or near a user premises 309. Light bulbs 102 capable of reading RFID tags 104 can be installed in interior and/or exterior locations into light bulb sockets that provide an electricity source.

A user may enroll, register or otherwise associate a light bulb 102 with a user account within the computing environment 303 via the product tracking application 325 so that the light bulb 102 is associated with the user account and that subsequent RFID tag data 351 generated by the light bulb 102 is associated with the particular user premises 309 in which the light bulb 102 is installed. A user may enroll, register or otherwise associate a light bulb 102 with a user account by employing pairing functionality associated with a ZigBee home automation system or other systems with proximity based pairing mechanisms. Additionally, such a pairing mechanism may facilitate providing network interface details, such as a Wi-Fi network name and/or password, to the light bulb 102, so that the light bulb 102 can communicate with the product tracking application 325 via a Wi-Fi network within the user premises 309. In some embodiments, the light bulb 102 can be provided with a network interface that allows the light bulb 102 to communicate with a home automation hub or a device within or near the user premises 309 via a personal area network. Such a device may forward RFID tag data 351 to the product tracking application 325 from light bulbs 102.

In some embodiments, upon enrolling, registering or otherwise associating a light bulb 102 with the product tracking application 325, a user may also specify a particular location, room or floor within or near the user premises 309 in which the light bulb 102 is installed. In this way, the product tracking application 325, upon receiving data from a light bulb 102, can associate the data with a particular location within or near the user premises 309.

Upon enrolling, registering or otherwise associating a light bulb 102 according to embodiments of the disclosure with a user account, the light bulb 102 can be configured to transmit RFID interrogator signals within an area in which the light bulb 102 is installed when an electricity source is provided. In one embodiment, an RFID reader integrated within the light bulb 102 can be coupled to an electricity source via internal circuitry of the light bulb that couples a light source (e.g., one or more light emitting diodes, fluorescent light source, incandescent filaments, etc.) to the electricity source. Accordingly, the light bulb 102 can be provided with power via an electricity source that is activated by a user via a switch and/or light fixture in which the light bulb is installed. In some embodiments, as will be described in further detail below, the light bulb 102 can be provided with power reserve, such as one or more batteries and/or capacitors, to provide a power source to the RFID reader integrated within the light bulb 102 when an electricity source is deactivated by a user via a switch and/or a light fixture. In this way, the RFID reader can obtain data from RFID tags 104 even when the electricity source to which the light bulb 102 is connected is deactivated or removed from the light bulb 102.

The various light bulbs 102 within the user premises 309 can initiate RFID interrogator signals to be transmitted from the light bulb 102 to an area in which the light bulb is installed, such as within a room, building or in an exterior environment in which the light bulb 102 is installed. In one embodiment, the RFID reader functionality of the light bulb 102 is configured to periodically transmit interrogator signals according to a predefined polling schedule. Should there be RFID tags 104 located within the area, the RFID tags 104 can transmit a response to the interrogator signals that includes an identifier stored on the RFID tag 104.

Upon receiving a response to the interrogator signals, the RFID reader integrated within the light bulb 102 can extract an identifier from the RFID tag 104 and forward the identifier to the product tracking application 325 along with identifying information about the light bulb 102. The product tracking application 325 can determine a user premises 309 to which the light bulb 102 corresponds based upon the identifying information associated with the light bulb 102 from the premises data 349. The product tracking application 325 can also determine a product or other item that corresponds to the identifier from the RFID tag 104 based upon the product identifier 339 and/or product data 337 in a product catalog stored in the data store 316. Additionally, the product tracking application 325 can associate the product with a user account associated with the user premises 309 within the user data 347 and/or RFID tag data 351.

In some embodiments, the product tracking application 325 can facilitate the generating of product recommendations based upon the RFID tag data 351 associated with a particular user. For example, the product tracking application 325 can generate a recommendation for a product that is related to or complementary to a particular product corresponding to a product associated with the user account as RFID tag data 351. As another example, the product tracking application 325 can generate a recommendation for an accessory product or an upgraded version of a product based upon identification of a particular product corresponding to a product associated with the user account as RFID tag data 351.

The product tracking application 325 can also assist with taking inventory of products or items within the user premises 309 based upon data obtained from RFID tags 104 via light bulbs 102 installed within the user premises 309. As noted above, the product tracking application 325 can associate identifiers corresponding to RFID tags 104 as RFID tag data 351 in the data store 316. Accordingly, in the event of the loss or damage of an item or product, the product tracking application 325 can, in one embodiment, generate one or more user interfaces (e.g., web page, application user interface, etc.) through which an inventory of items associated with the user premises 309 can be accessed. Additionally, such an inventory can also be associated with respective locations within the user premises 309 because data obtained from the light bulbs 102 in a user premises can also be associated with a particular location within the user premises based upon a location of the light bulb 102 within the user premises 309 from which the RFID tag data 351 was received.

As another example, the product tracking application 325 can also track movement of products or other items within the user premises 309. As noted above, a light bulb 102 can be associated with a particular room, floor, region or other indicia of location within the user premises 309 when the light bulb 102 is enrolled, registered or otherwise associated with the product tracking application 325. Accordingly, as an item or product is moved within the user premises 309, a location within the user premises 309 can also be tracked and/or updated based upon which of the light bulbs 102 associated with the user premises 309 are reporting the identifier corresponding to the RFID tag 104. In this way, the product tracking application 325 can facilitate locating an item or product having an RFID tag 104 within the user premises 309 should the item, for example, become lost. In one embodiment, the product tracking application 325 can generate a user interface rendered upon a computing device or mobile device that displays a location within the user premises 309 of a particular item or product.

Figure 4:
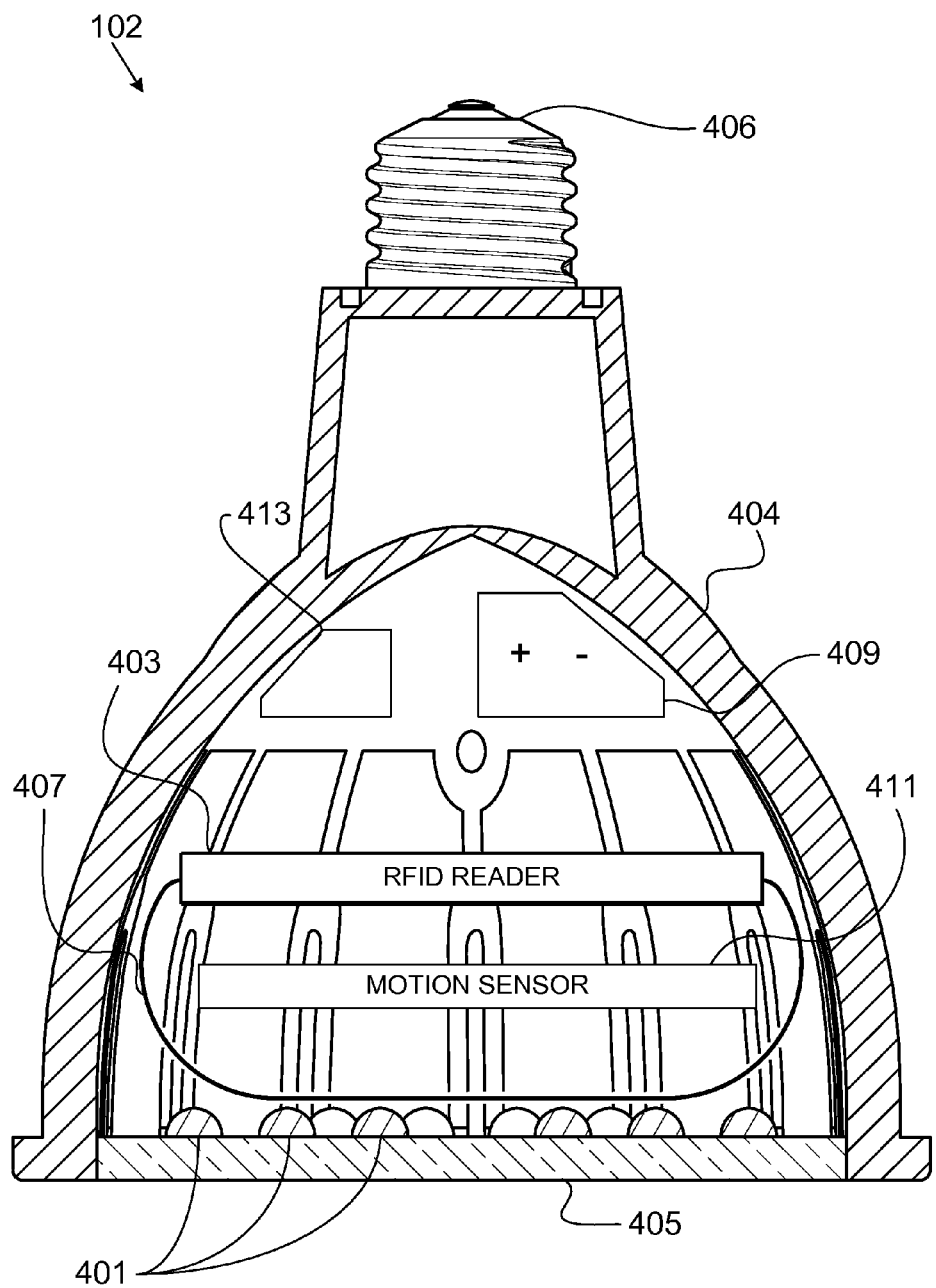
FIGS. 4-7 are drawings of an example light bulb in accordance with various embodiments of the disclosure.

Referring next to FIG. 4, shown is one non-limiting example embodiment of a light bulb 102 according to an embodiment of the disclosure. The depicted light bulb 102 integrates a light source 401 and an RFID reader 403 within a housing 404. In the example of FIG. 4, the light source 401 comprises one or more LED's configured to project or emit light through a surface 405 of the light bulb 102. The surface 405 of the light bulb 102 is configured to allow the passage of light such that an area in which the light bulb 102 is installed is illuminated by the light source 401 when an electricity source coupled to the light bulb 102 is activated. In some embodiments, the light source 401 may also be positioned outside of the housing 404, and the depicted example of the light source 401 being positioned within the housing is but one example.

The RFID reader 403 is also coupled to an antenna system 407, or at least one antenna wire loop, that is configured to facilitate the transmission of RFID interrogator signals, or creation of an electromagnetic field that excites or energizes RFID tags 104 that may be located within a vicinity of the light bulb 102. In one embodiment, the RFID reader 403 is an active reader. However, it should be appreciated that the RFID reader 403 can also be configured as a passive reader.

The light bulb 102 can also be configured with an Edison screw 406 or other electrical coupling that facilitates connection of the light bulb 102 to an electricity source, such as via a light fixture. The light bulb 102 can, in some embodiments, be configured with a power reserve 409, which may comprise a battery system, capacitor system or any other system in which a power reserve can be stored. The power reserve 409 can be coupled to the electrical coupling and be configured to charge when electricity is flowing via the Edison screw 406.

The light bulb 102 can also be configured with a motion sensor 411 that can detect motion or motion levels of an area in which the light bulb 102 is installed. In one embodiment, the motion sensor 411 can be aimed outside of the housing 404 and/or toward the area in which the light source 401 is aimed to facilitate detection of motion in a room in which the light bulb 102 is installed. For example, if the light bulb 102 is installed in a ceiling light fixture, the motion sensor 411 can be configured to detect motion within the room in which the light bulb 102 is installed.

The light bulb 102 can also be configured with a processor system 413 comprising at least one processor that can be configured to control the activities of the light bulb 102 with respect to detection of RFID tags 104 as well as power management capabilities of the light bulb 102. In some embodiments, the light bulb 102 may also be configured with memory or other mass storage in which executable code that is executable by the processor system 413 or other data can be stored. The light bulb 102 may also be configured with network capability, or one or more network interfaces, that facilitate communication with the product tracking application 325 or any other computing device by the processor system 413.

One or more of the motion sensor 411, the RFID reader 403, the light source 401 and the processor system 413 can be coupled to the power reserve 409 so that they may operate when an electricity source to which the light bulb 102 is connected is deactivated. In other words, the power reserve 409 can power some of the systems when a switch to which the light bulb 102 is coupled via a light fixture is turned "off." In some embodiments, the RFID reader 403, the motion sensor 411 and the processor system 413 can be coupled to the power reserve 409 while the light source 401 can be coupled only to the electricity source, as the light bulb 102 may not require the light source 401 to operate in the absence of an electricity source. In some embodiments, the light bulb 102 can also include a heat sensor, a temperature sensor, a smoke sensor, a microphone or other types of sensors in addition to or instead of the motion sensor 411 that can be coupled to the power reserve 409 or an electricity source and that detect conditions or activity within an area external to the housing 404 in which the light bulb 102 is installed. These sensors can obtain sensor data that is related to conditions or activity occurring within an area in which the light bulb 102 is installed that can also be utilized to determine whether to activate the RFID reader 403.

The processor system 413 can facilitate or control the activities of the RFID reader 403 within the light bulb 102. In one embodiment, the motion sensor 411 can provide motion levels or motion data to the processor system 413, which can direct the RFID reader 403 to activate only when motion levels meeting a motion threshold are detected by the motion sensor 411. In other words, in some embodiments, the RFID reader 403 can be activated by the processor system 413 only when a certain level of motion is detected in an area in which the light bulb 102 is installed in order to reduce power consumption attributable to the RFID reader 403. In other embodiments, the RFID reader 403 can be activated by the processor system 413 and powered by the electricity source to which the light bulb 102 is connected when the light bulb 102 is turned "on" and powered by the power reserve 409 when the light bulb 102 is turned "off".

The RFID reader 403 can also be activated in response to a heat sensor or temperature sensor integrated within the light bulb 102 detecting temperature data that exceeds or drops below a certain threshold. For example, a particular light bulb 102 may be positioned within a refrigerated environment, and the light bulb 102 can report temperature data to the product tracking application, which can generate an alert that is communicated to a user associated with the light bulb 102 if the temperature meets or exceeds a particular threshold, as such a condition in a refrigerated environment can indicate potential spoilage of items in the environment.

As another example, a temperature or other conditions such as data from a chemical sensor may be reported to the product tracking application 325 and indicate a potentially unsafe environment, such as a fire, excess levels of carbon monoxide, smoke, etc. Such sensor data can trigger activation of the RFID reader 403 and communication of RFID tag data within the environment to the product tracking application 325 so that the product tracking application 325 can identify items within the room based upon the RFID tag data. For example, the product tracking application 325 can determine whether the RFID tag data corresponds to employee or user badges to facilitate evacuation of a room or assist emergency personnel. Additionally, the light bulb 102 may also be integrated with a microphone, and the RFID reader 403 can be activated by the processor system 413 in response to volume levels captured by the microphone meeting or exceeding a particular threshold.

The RFID reader 403 and/or processor system 413 can also perform filtering of data received from RFID tags 104. For example, if a signal strength associated with a response to interrogator signals transmitted by the RFID reader 403 fails to meet a signal strength threshold, the RFID reader 403 and/or processor system 413 can filter these responses and avoid sending identifiers associated with the corresponding RFID tags 104 to the product tracking application 325. In some embodiments, the processor system 413 can determine a signal strength threshold based upon a distribution of signal strengths that are observed by the RFID reader 403. For example, the processor system 413 can filter responses associated with a signal strength that are outside of the top ten percent or any other percentage of responses in terms of signal strengths or any other signal fidelity metric.

In some embodiments, the processor system 413 can forward the identifier along with corresponding signal strength data to the product tracking application 325, which can determine whether the identifiers should be filtered based upon the signal strength data associated with the response from the RFID tag 104. By performing filtering according to signal strength data, RFID tags 104 that are potentially not within the user premises 309 or within a desired RFID signal reading area can be filtered from the data obtained by light bulbs 102 and transmitted to the product tracking application 325.

Figure 5:
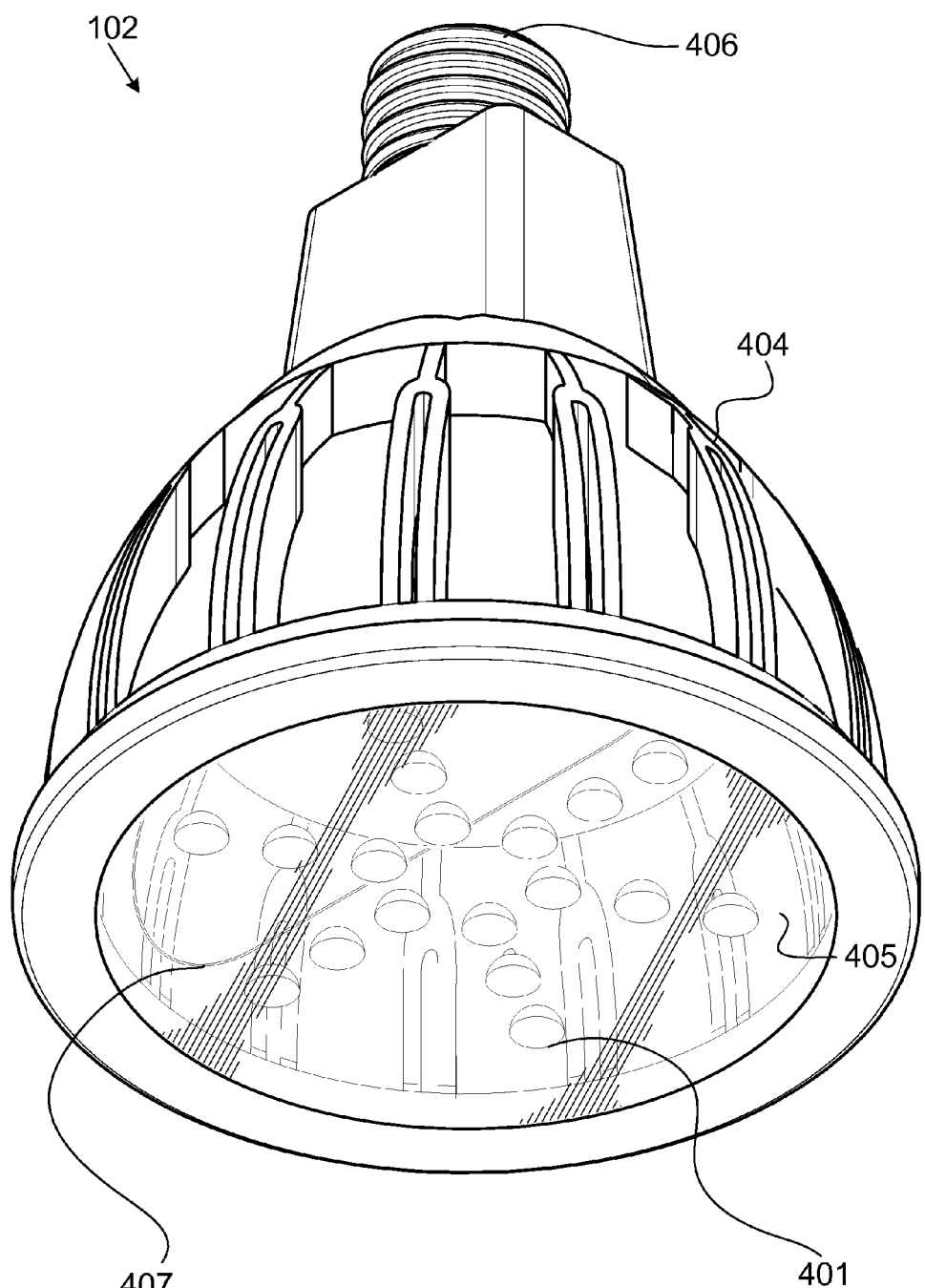

Referring next to FIG. 5, shown is an alternative exterior perspective view of a light bulb 102 according to various embodiments of the disclosure. The light bulb 102 can be configured to appear similar to a conventional light bulb in that the various components of the light bulb 102 described in the discussion of FIG. 4 can be integrated within the housing 404 of the light bulb.

Figure 6:
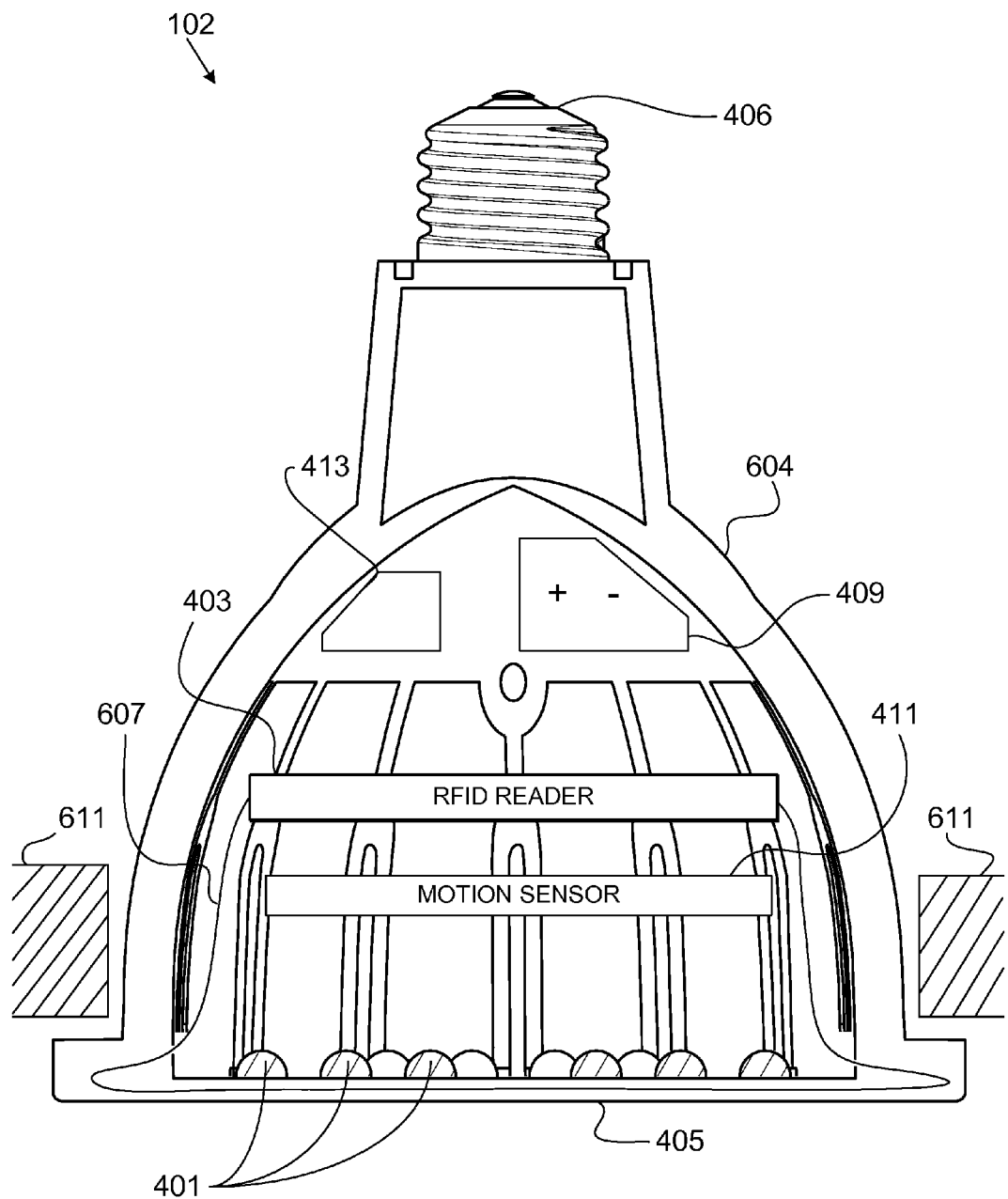

Referring next to FIG. 6, shown is an alternative exterior perspective view of a light bulb 102 according to various embodiments of the disclosure. As in the case of the example shown in FIG. 5, a light bulb 102 according to embodiments of the disclosure can be configured to appear similar to a conventional light bulb in that the various components of the light bulb 102 described in the discussion of FIG. 4 can be integrated within the housing 404 of the light bulb. In the alternative example of FIG. 6, the housing 604 can be formed in an alternative shape so that the antenna system 607 can be expanded relative to the example shown in FIG. 4, which may be desirable in order to expand a range of the RFID reader 403. In the example shown in FIG. 6, the housing 604 and antenna system 607 can be configured such that the light bulb 102 extends radially outward from a light fixture in which the light bulb 102 is installed.

Figure 7:
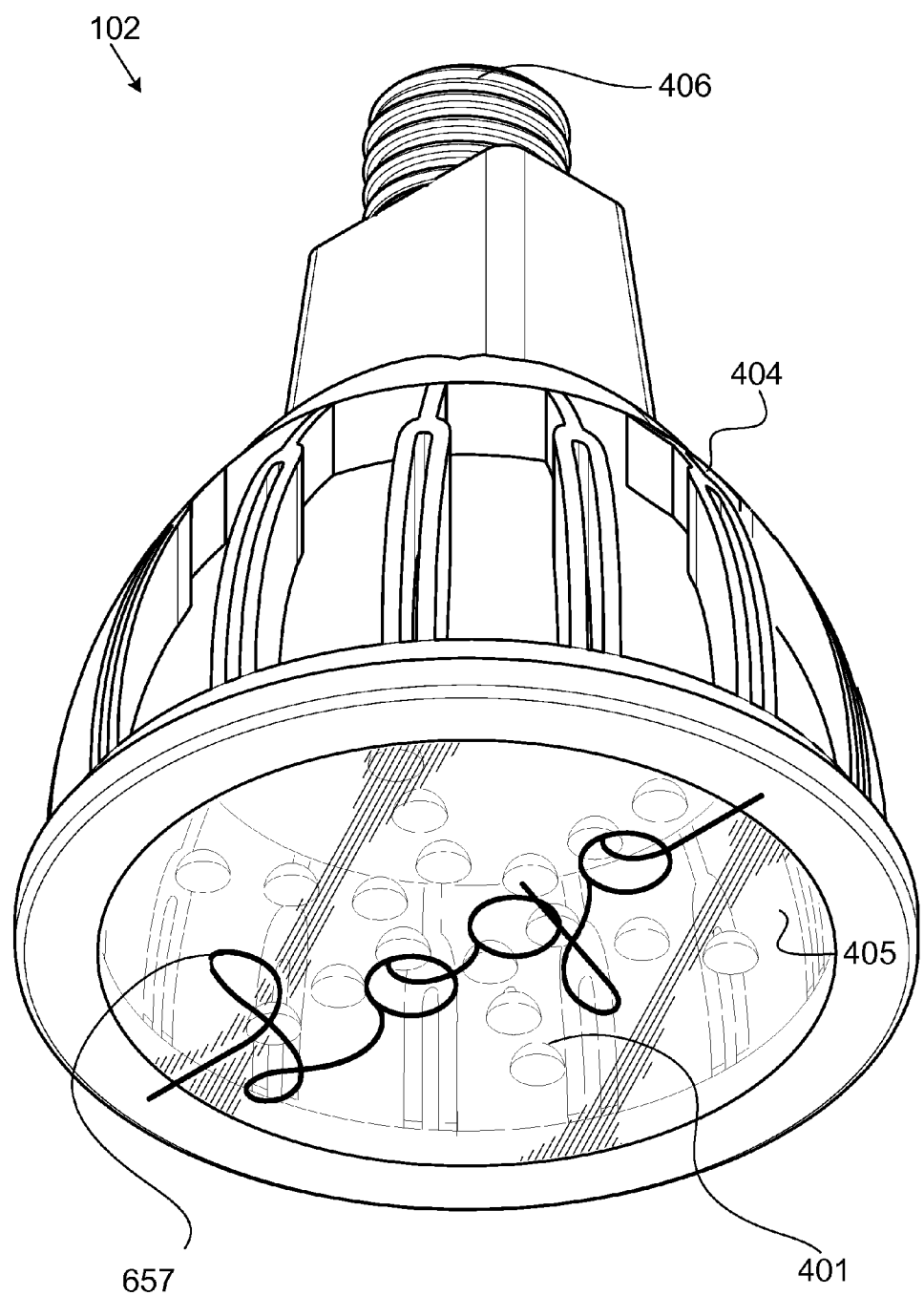

Referring next to FIG. 7, shown is an alternative exterior perspective view of a light bulb 102 according to various embodiments of the disclosure. As in the case of the example shown in FIG. 5, a light bulb 102 according to embodiments of the disclosure can be configured to appear similar to a conventional light bulb in that the various components of the light bulb 102 described in the discussion of FIG. 4 can be integrated within the housing 404 of the light bulb. In the alternative example of FIG. 6, the antenna system 657 associated with the RFID reader 403 can be formed in a shape to resemble word, text, a picture, a logo or any other design that may be visible on or through the surface 405. In some embodiments, the antenna system 407, 607, 657 can be placed on the exterior of the housing 404 or internal to the housing 404.

Figure 8:
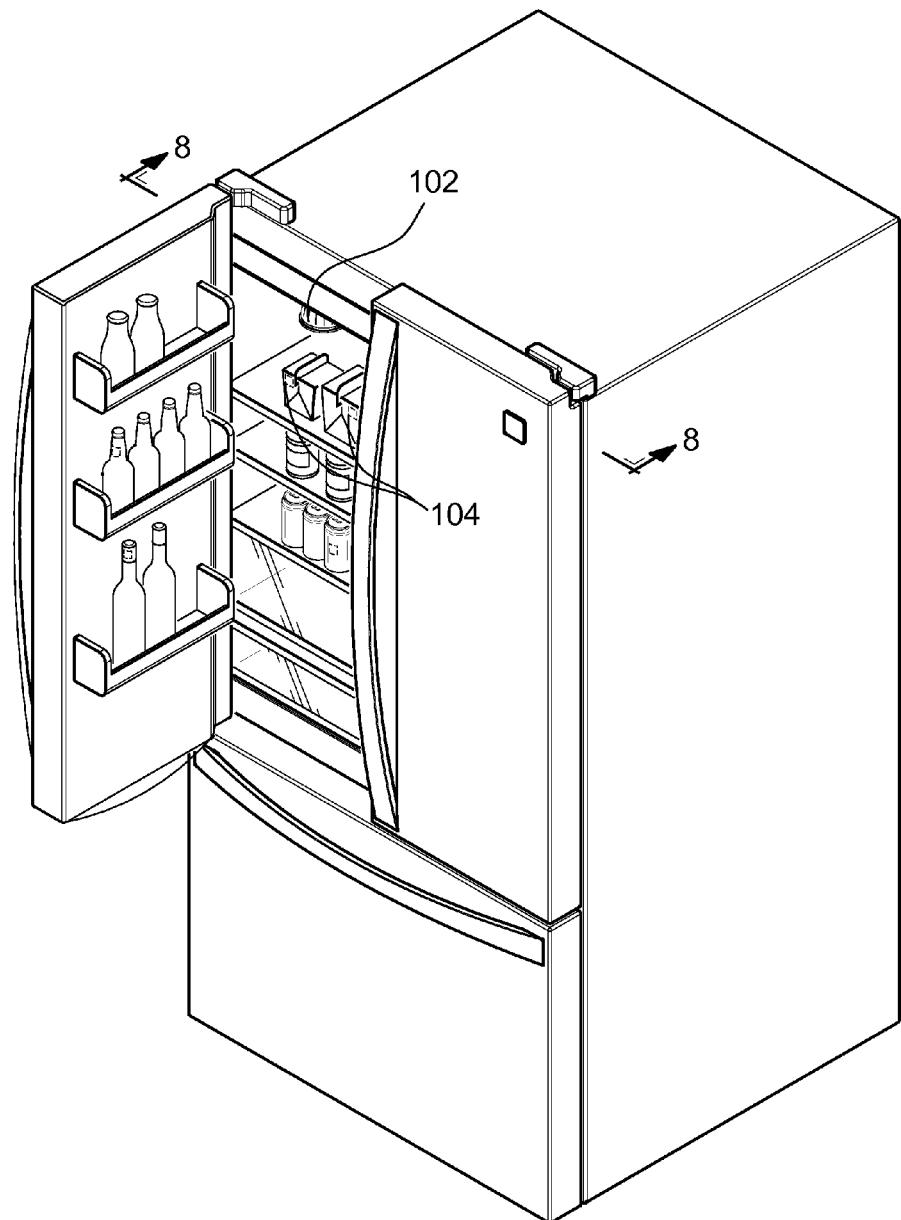
FIGS. 8-9 are drawings of an example light bulb in accordance with various embodiments of the disclosure.

Referring next to FIG. 8, shown is an alternative environment in which a light bulb 102 according to various embodiments of the disclosure can be applied. In the example of FIG. 7, the light bulb 102 can be installed within a refrigerator and configured to obtain data from RFID tags 104 that may be integrated within consumable items or other items within the environment. The data obtained from the RFID tags 104 can also be transmitted to the product tracking application 325, which can, in some embodiments, generate product recommendation and/or product replenishment recommendations with respect to consumable items. Additionally, the light bulb 102 can be configured to exist in an environment that is potentially colder or hotter than room temperature as well as be installed within a light socket of a varying size relative to other light fixtures.

Figure 9:
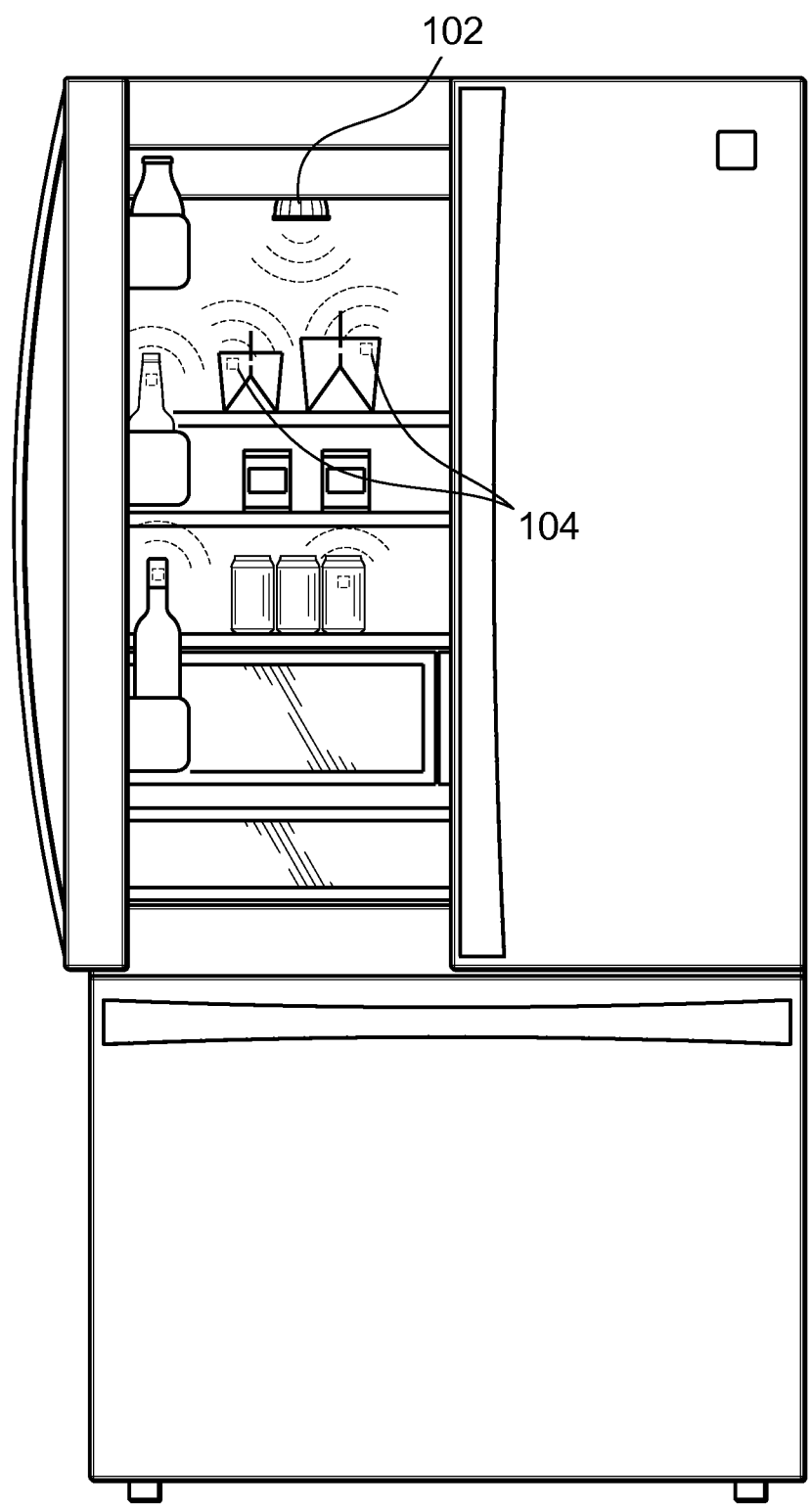

Continuing the example of FIG. 8, reference is now made to FIG. 9, which depicts an alternative view of the environment shown in FIG. 8. As described above, the light bulb 102 can be configured to transmit RFID interrogator signals to which RFID tags 104 can respond with one or more identifiers from which product or item information can be identified by the product tracking application 325. Accordingly, it should be appreciated that such a light bulb 102 can be installed in various types of environments in or near a user premises 309 in order to obtain RFID tag data 351.

Figure 10:
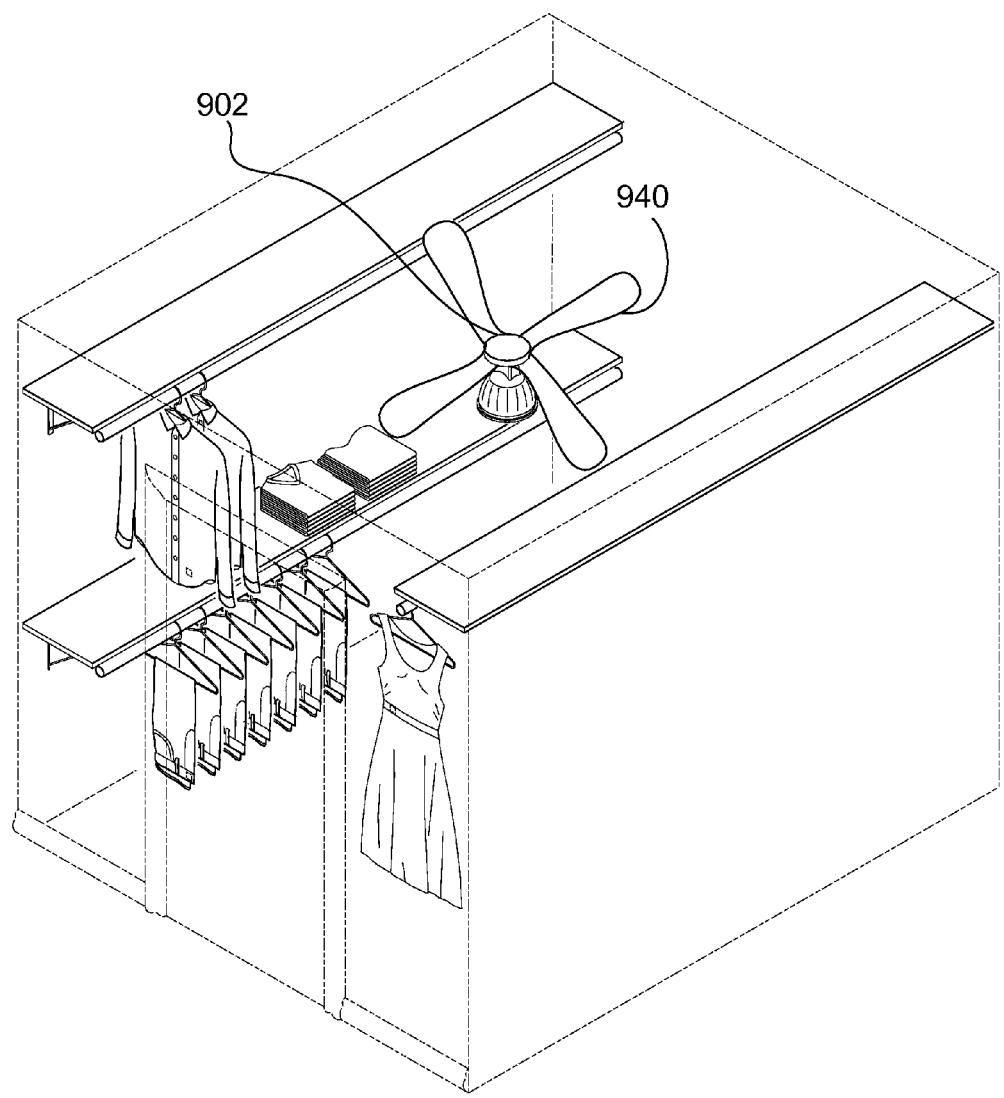
FIG. 10 is a drawing of a ceiling fan in accordance with various embodiments of the disclosure.

Referring next to FIG. 10, shown is an alternative example of an embodiment of the instant disclosure. FIG. 10 illustrates a scenario in which one or more of the RFID reader 403, antenna system 407, motion sensor 411, power reserve 409 and processor system 413 can be integrated into alternative types of electrical fixtures. In the example of FIG. 10, the various components described with respect with the light bulb 102 shown in FIG. 4 can be incorporated into a ceiling fan 902 as shown in FIG. 10. Additionally, in embodiments, the antenna system 407 associated with the RFID reader 403 can be integrated into one or more of the fan blades 940 of the ceiling fan 902, which can improve the performance of the RFID reader 403 due to an increased antenna loop size and because of the movement of the fan blades 940 when the fan blades 940 are in motion. Additionally, embodiments of the disclosure can also take the form of other light fixtures, appliances or devices that can be installed within or on a building and in which an RFID reader 403, antenna system 407, power reserve 409, motion sensor 411 and/or processor system 413 can be incorporated. For example, embodiments of the disclosure may also take the form of a smoke detector, carbon monoxide sensor, light fixture, or other device that can be installed within a building that are potentially coupled to an electricity source.

Figure 11:
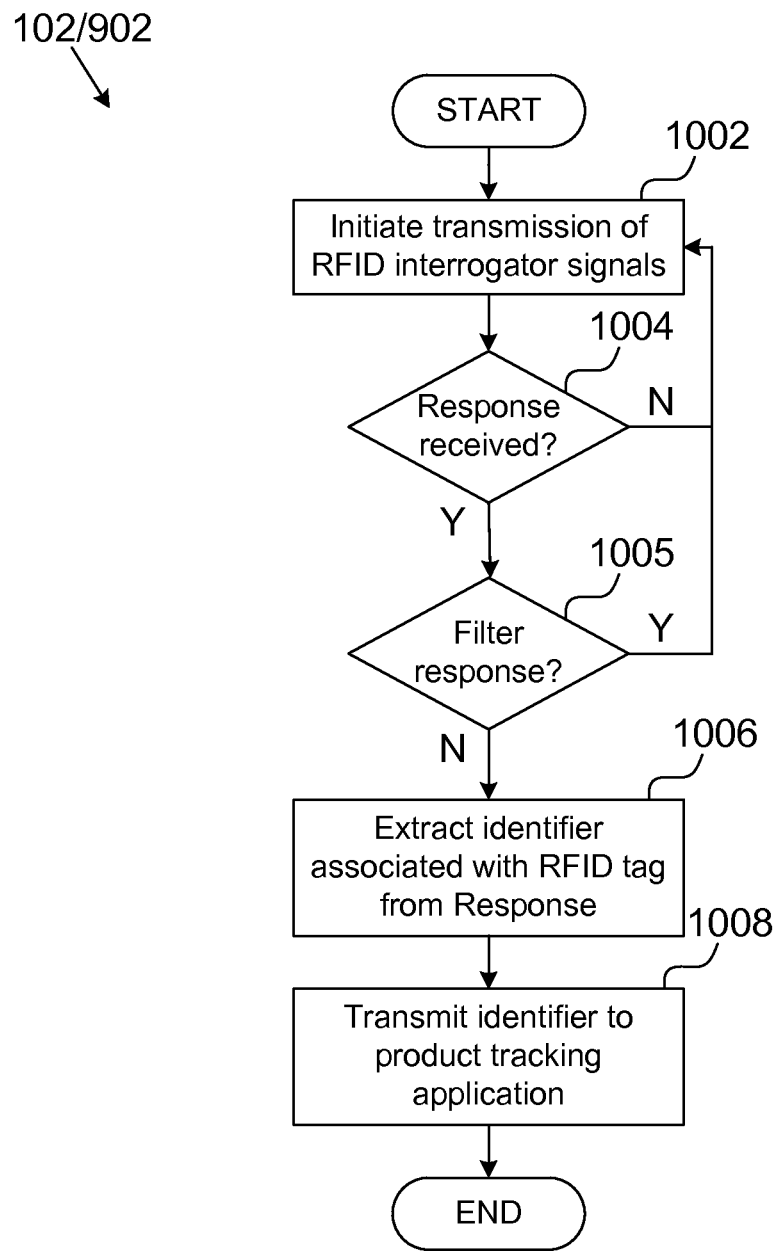
FIGS. 11-12 are flowcharts respectively illustrating one example of functionality implemented as portions of a light bulb and/or ceiling fan according to various embodiments of the present disclosure.

Referring next to FIG. 11, shown is a flowchart that provides one example of the operation of a portion of a light bulb 102, ceiling fan 902 and other embodiments of the instant disclosure. It is understood that the flowchart of FIG. 11 provides merely an example of the many different types of functional arrangements that may be employed to implement the operation of the portion of a light bulb 102, ceiling fan 902 and other embodiments of the instant disclosure as described herein. As an alternative, the flowchart of FIG. 11 may be viewed as depicting an example of elements of a method implemented in a light bulb 102, ceiling fan 902 and other embodiments of the instant disclosure. The following discussion will describe the flowchart of FIG. 11 in terms of implementation within a light bulb 102 according to embodiments of the disclosure. However, the following discussion is also applicable and can be implemented in a ceiling fan 902 and/or other fixture according to various embodiments.

Beginning with box 1002, the light bulb 102 can initiate transmission of RFID interrogator signals or generate an electromagnetic field that can excite or energize RFID tags 104 that may be present within an area in which the light bulb 102 is installed. At box 1004, the RFID reader integrated within the light bulb 102 can determine whether a response to the interrogator signals is received. If a response is not received, then the process can proceed to box 1002, where the light bulb 102 can continue transmitting RFID interrogator signals. As noted above, the light bulb 102 can transmit interrogator signals periodically and/or when a motion sensor 411 detects motion levels that meet a motion threshold or as otherwise described herein.

If a response is received by the RFID reader, then at box 1005, the light bulb 102 can determine at box 1005 whether to filter the response. A response from an RFID tag 104 can be filtered and/or discarded if it fails to meet a signal strength threshold. If the response is not filtered, then at box 1006 the light bulb 102 can extract an identifier from the response. At box 1008, the light bulb 102 can transmit the identifier to the product tracking application 325 via a network interface associated with or accessible to the light bulb 102. Thereafter, the process subsequently ends.

Figure 12:
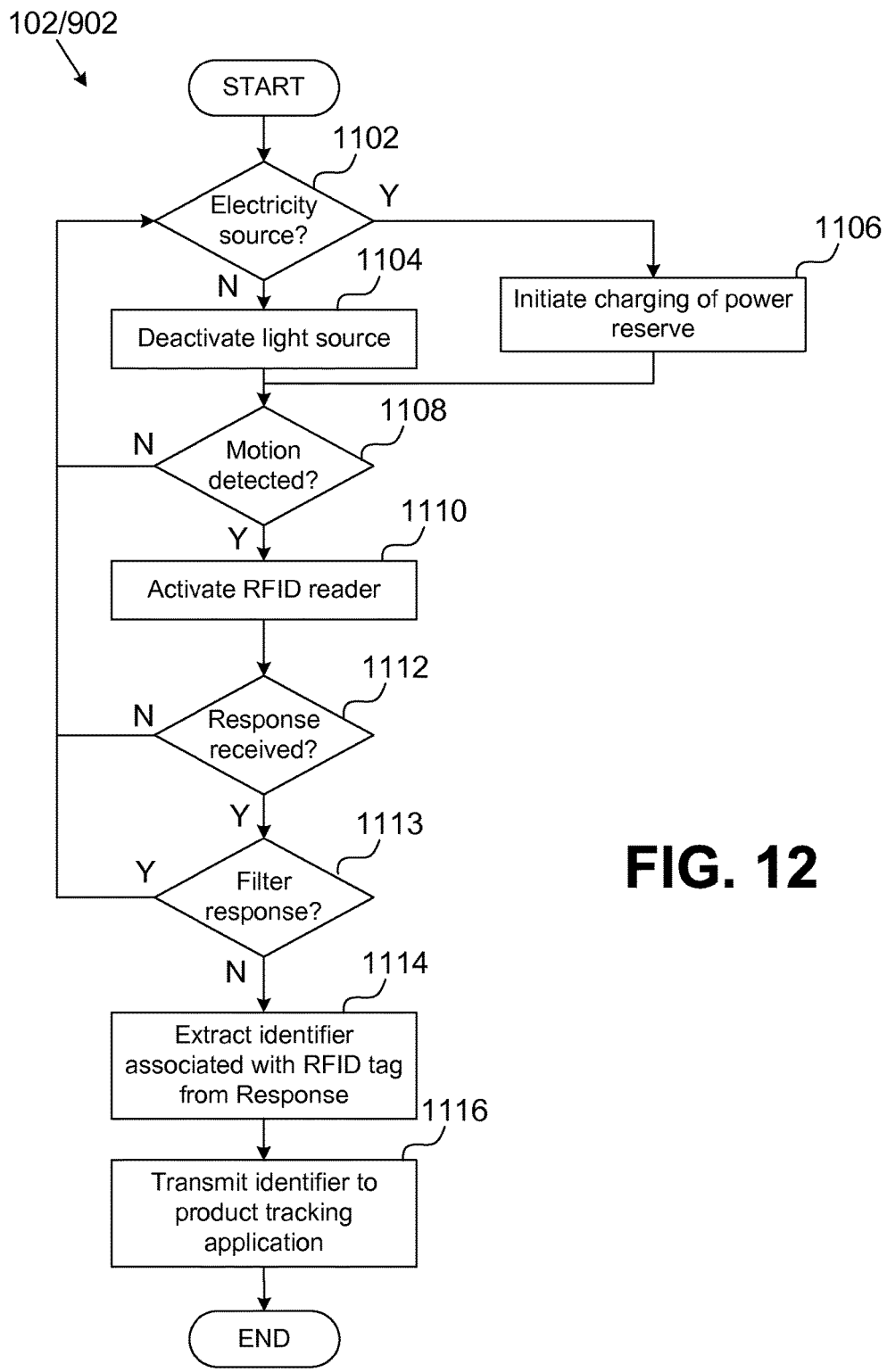

Referring next to FIG. 12, shown is a flowchart that provides one example of the operation of a portion of a light bulb 102, ceiling fan 902 and other embodiments of the instant disclosure. It is understood that the flowchart of FIG. 12 provides merely an example of the many different types of functional arrangements that may be employed to implement the operation of the portion of a light bulb 102, ceiling fan 902 and other embodiments of the instant disclosure as described herein. As an alternative, the flowchart of FIG. 12 may be viewed as depicting an example of elements of a method implemented in a light bulb 102, ceiling fan 902 and other embodiments of the instant disclosure. The following discussion will describe the flowchart of FIG. 12 in terms of implementation within a light bulb 102 according to embodiments of the disclosure. However, the following discussion is also applicable and can be implemented in a ceiling fan 902 and/or other fixture according to various embodiments.

Beginning with box 1102, the light bulb 102 can determine whether an electricity source to which the light bulb 102 is connected is activated. In other words, the light bulb 102 can determine whether power is flowing to the light bulb 102 from an electricity source, such as via a light switch. If so, then at box 1106, the light bulb 102 can initiate charging of the power reserve 409 integrated within the light bulb 102. Otherwise, the light bulb 102 can deactivate the light source 401.

At box 1108, the light bulb 102 can determine whether motion is detected by the motion sensor 411. As noted above, the motion sensor 411 can also determine whether a motion level detected by the motion sensor 411 meets a motion threshold. If not, then the process returns to box 1102. In this way, the light bulb 102 can conserve power associated with the power reserve 409 by only activating the RFID reader 403 when motion is detected by the motion sensor 411. If motion is detected, the process can proceed to box 1110, where the RFID reader 403 is activated.

At box 1112, the RFID reader integrated within the light bulb 102 can determine whether a response to the interrogator signals is received. If a response is not received, then the process can proceed to box 1102. If a response is received by the RFID reader, then at box 1113, the light bulb 102 can determine whether to filter the response. A response from an RFID tag 104 can be filtered and/or discarded if it fails to meet a signal strength threshold. If the response is not filtered, then at box 1114 the light bulb 102 can extract an identifier from the response. At box 1116, the light bulb 102 can transmit the identifier to the product tracking application 325 via a network interface associated with or accessible to the light bulb 102. Thereafter, the process subsequently ends. Alternatively or additionally to the motion sensor 411, the light bulb 102 may include one or more other sensors as described herein and activate or deactivate the RFID reader based on signals received from the one or more other sensors.

Figure 13:
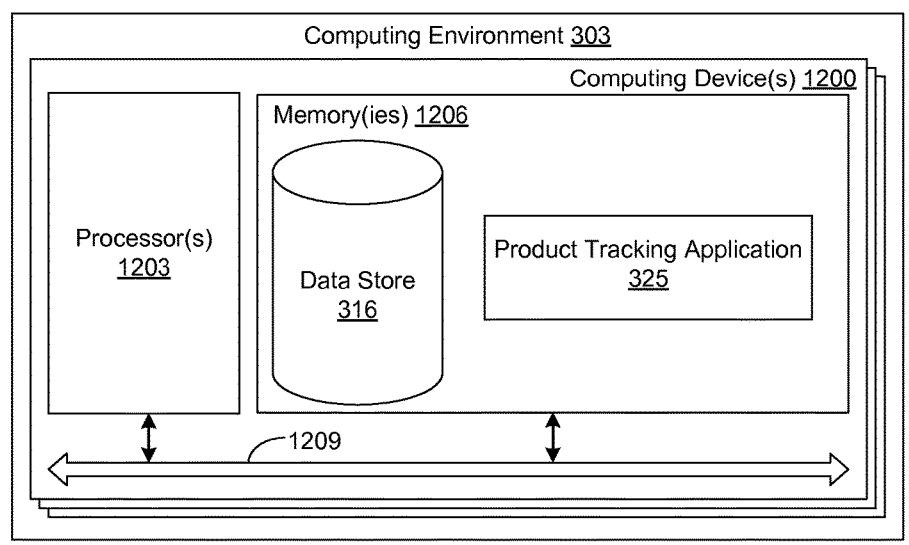
FIG. 13 is a schematic block diagram that provides one example illustration of a computing environment employed in the networked environment of FIG. 3 according to various embodiments of the present disclosure.

With reference to FIG. 13, shown is a schematic block diagram of the computing environment 303 according to an embodiment of the present disclosure. The computing environment 303 includes one or more computing devices 1200. Each computing device 1200 includes at least one processor circuit, for example, having a processor 1203 and a memory 1206, both of which are coupled to a local interface 1209. To this end, each computing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the product tracking application 325 and/or potentially other applications. Also stored in the memory 1206 may be a data store 316 and other data. In addition, an operating system may be stored in the memory 1206 and executable by the processor 1203.

It is understood that there may be other applications that are stored in the memory 1206 and are executable by the processor 1203 and/or processor system 413 as can be appreciated. Where any component discussed herein is implemented in the form of software, any one of a number of programming languages may be employed such as, for example, C, C++, C#, Objective-C®, Java®, JavaScript®, Perl®, PHP®, Visual Basic®, Python®, Ruby®, Flash®, or other programming languages.

A number of software components are stored in the memory 1206 and are executable by the processor 1203 and/or memory associated with the processor system 413. In this respect, the term "executable" means a program file that is in a form that can ultimately be run by the processor 1203 and/or processor system 413. Examples of executable programs may be, for example, a compiled program that can be translated into machine code in a format that can be loaded into a random access portion of a memory and run by the processor 1203 and/or processor system 413, source code that may be expressed in proper format such as object code that is capable of being loaded into a random access portion of a memory and executed by the processor 1203 and/or processor system 413, or source code that may be interpreted by another executable program to generate instructions in a random access portion of a memory to be executed by the processor 1203 and/or processor system 413, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 and/or a memory associated with the processor system 413 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 and/or processor system 413 may represent multiple processors 1203 and/or multiple processor cores and the memory 1206 or memory associated with the processor system 413 may represent multiple memories that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the product tracking application 325 and logic executed by the processor system 413, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 11-12 show the functionality and operation of an implementation of portions of a light bulb 102 and/or processor system 413 integrated within a light bulb 102. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 11-12 show a specific order of execution, it is understood that the order of execution may differ from that which is depicted. For example, the order of execution of two or more blocks may be scrambled relative to the order shown. Also, two or more blocks shown in succession in FIGS. 11-12 may be executed concurrently or with partial concurrence. Further, in some embodiments, one or more of the blocks shown in FIGS. 11-12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the product tracking application 325 and various portions of the processor system 413, that comprises software or code can be embodied in any non-transitory computer-readable medium for use by or in connection with an instruction execution system such as, for example, a processor 1203 in a computer system or other system, portions of a light bulb 102, ceiling fan 902, and/or another embodiment of the disclosure. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the product tracking application 325 and various portions of the processor system 413, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A light bulb, comprising:
   a housing comprising at least one surface through which light may pass, the housing further comprising a threaded metal base compatible with a light fixture with an Edison screw socket, wherein the threaded metal base is electrically connected to the light bulb, the housing further comprising an outwardly extending flange that extends circumferentially about an axis along which the threaded metal base is rotatable;
   a radio frequency identification (RFID) reader integrated within the housing, the RFID reader comprising at least one antenna that at least partially extends into the outwardly extending flange of the housing, the RFID reader comprising an active reader;
   a light source integrated within the housing, the light source configured to emit light through the at least one surface;
   a motion sensor integrated within the housing, the motion sensor configured to detect motion within a space in which the light bulb is installed;
   at least one processor and a memory integrated within the housing, the at least one processor in communication with at least the motion sensor and the RFID reader;
   a power reserve integrated within the housing, the power reserve coupled to the at least one processor, the memory, the RFID reader and the motion sensor, the power reserve being configured to power the at least one processor, the memory, the RFID reader and the motion sensor;
   wherein at least one of the light source, the power reserve, the motion sensor and the RFID reader are coupled to an electricity source, the light source configured to activate when electricity is provided via the electricity source;
   wherein the at least one processor is configured to activate the RFID reader when the motion sensor detects motion; and
   wherein the RFID reader is configured to emit interrogator signals when activated by the at least one processor.

2. The light bulb of claim 1, further comprising a communication device facilitating communication with at least one network.

3. The light bulb of claim 2, wherein the RFID reader is configured to obtain a response to the interrogator signals and the at least one processor is configured to transmit the response to at least one computing device accessible via the at least one network.

4. The light bulb of claim 1, wherein the at least one processor is configured to filter a response to the interrogator signals having a signal strength that fails to meet a signal strength threshold.

5. The light bulb of claim 4, wherein the at least one processor is configured to determine the signal strength threshold based upon a distribution of signal strengths corresponding to a plurality of responses obtained by the RFID reader.

6. The light bulb of claim 1, wherein the power reserve is configured to charge when electricity is provided via the electricity source and provide power to the motion sensor, the RFID reader and the at least one processor when electricity is not provided via the electricity source.

7. A light bulb, comprising:
   at least one processor;
   a motion sensor;
   a light source;
   a housing comprising a threaded metal base compatible with a light fixture with an Edison screw socket, wherein the threaded metal base is electrically connected to the light bulb, the housing further comprising an outwardly extending flange that extends circumferentially about an axis along which the threaded metal base is rotatable;
   an RFID reader integrated within the housing, the RFID reader comprising at least one antenna that at least partially extends into the outwardly extending flange of the housing; and
   a power reserve coupled to at least the RFID reader and the at least one processor; wherein the RFID reader, the at least one processor, the light source and the power reserve are integrated within a housing, the light source is configured to illuminate an area external to the housing and in which the light bulb is installed, and the at least one processor is configured to:
      initiate at least one RFID interrogator signal to be transmitted by the RFID reader when the motion sensor detects motion levels meeting a threshold;
      obtain a response to the at least one RFID interrogator signal received by the RFID reader;
      extract an identifier corresponding to an RFID tag associated with the response; and
      deactivating the RFID reader in response to detecting motion levels that fails to meet the threshold.

8. The light bulb of claim 7, wherein the at least one processor is configured to forward the identifier corresponding to the RFID tag to at least one computing device via a network.

9. The light bulb of claim 8, wherein the at least one computing device is configured to identify a product corresponding to the identifier.

10. The light bulb of claim 9, wherein the at least one computing device is configured to generate a product recommendation based at least in part upon the product corresponding to the identifier.

11. The light bulb of claim 7, wherein the RFID reader further comprises an antenna system integrated within the housing, the antenna system being configured to be visible from outside the housing, the antenna system being formed in a shape corresponding to at least one of a logo, a picture or text.

12. The light bulb of claim 7, further comprising a plurality of fan blades coupled to the housing, the plurality of fan blades being configured to rotate about the housing.

13. The light bulb of claim 12, further comprising an antenna system coupled to the RFID reader, wherein the antenna system comprises a wire loop integrated within at least one of the plurality of fan blades.

14. The light bulb of claim 7, further comprising a sensor integrated within the housing, the sensor configured to detect a condition associated with the area external to the housing.

15. The light bulb of claim 14, wherein the at least one processor is configured to activate the RFID reader when the sensor detects a condition meeting a threshold associated with the condition in the area external to the housing, wherein the condition corresponds to at least one of: temperature, smoke, or volume level.

16. A method, comprising:
- detecting, via at least one processor, motion levels meeting a motion threshold using a motion sensor within a housing of a light bulb, the housing having a threaded metal base compatible with a light fixture with an Edison screw socket, the threaded metal base being electrically connected to the light bulb, and the housing having an outwardly extending flange that extends circumferentially about an axis along which the threaded metal base is rotatable;
- causing emission, via at least one processor, of an interrogator signal from an RFID reader comprising at least one antenna that at least partially extends into the outwardly extending flange of the housing to energize a radio frequency identification (RFID) tag in response to the motion levels meeting the threshold, the RFID reader being integrated within the housing with the at least one processor and a light source that is configured to illuminate an area external to the housing, the housing comprising a threaded metal base compatible with a light fixture with an Edison screw socket, wherein the threaded metal base is electrically connected to the light source;
- obtaining, via the at least one processor, a response to the interrogator signal, the response comprising an identifier associated with the RFID tag;
- transmitting, via the at least one processor, the identifier associated with the RFID tag to at least one computing device via a network interface accessible to the at least one processor; and
- initiating, via the at least one processor, identification of a product associated with the identifier in a product catalog accessible to the at least one computing device.

17. The method of claim 16, further comprising:
- initiating, via the at least one processor, association of the product with a user account; and
- initiating, via the at least one processor, generation of a product recommendation based at least upon the product and the user account.

18. The method of claim 16, further comprising:
- initiating, via the at least one processor, association of the product with a user account; and
- initiating, via the at least one processor, association of the product with a particular location associated with the user account based upon an identifier associated with the RFID reader.

19. The method of claim 16, further comprising:
- determining, via the at least one processor, whether an electricity source coupled to the RFID reader and the light source is deactivated; and
- activating, via the at least one processor, a power reserve integrated within the housing in response to determining that the electricity source is deactivated.

20. The method of claim 16, further comprising:
- determining, via at least one processor, whether the motion level, detected by the motion sensor integrated within the housing, of the area external to the housing meets the motion threshold; and
- deactivating, via the at least one processor, the RFID reader in response to the motion level failing to meet the motion threshold.

* * * * *